United States Patent [19]
Iizuka

[11] Patent Number: 5,703,654
[45] Date of Patent: Dec. 30, 1997

[54] VIDEO SIGNAL ENCODER

[75] Inventor: Akira Iizuka, Tokyo, Japan

[73] Assignee: Nippon Steel Corporation, Tokyo, Japan

[21] Appl. No.: 667,589

[22] Filed: Jun. 24, 1996

[30] Foreign Application Priority Data

Jun. 30, 1995 [JP] Japan ................... 7-188255

[51] Int. Cl.⁶ ............ H04N 7/01; H04N 5/253; H04N 7/08
[52] U.S. Cl. ............ 348/446; 348/97; 348/384; 348/474
[58] Field of Search ............ 348/446, 441, 348/459, 384, 97, 526; 349/429, 439, 473, 474; H04N 7/01, 11/20, 5/253, 9/11, 7/08, 7/84

[56] References Cited

U.S. PATENT DOCUMENTS

| | | | |
|---|---|---|---|
| 4,876,596 | 10/1989 | Faroudja | 348/450 |
| 4,982,280 | 1/1991 | Lyon et al. | 348/448 |
| 5,072,296 | 12/1991 | Lim | 348/459 |
| 5,365,280 | 11/1994 | De Hann et al. | 348/97 |
| 5,452,011 | 9/1995 | Martin et al. | 348/97 |
| 5,550,592 | 8/1996 | Markandey et al. | 348/448 |
| 5,563,651 | 10/1996 | Christopher et al. | 348/97 |

*Primary Examiner*—Michael H. Lee
*Attorney, Agent, or Firm*—Pollock, Vande Sande & Priddy

[57] ABSTRACT

A video signal encoder encodes an interlaced video signal having a field frequency of 60 Hz obtained by overlapping a portion of first fields and second fields, in which the first field and the second field are produced from one frame of a non-interlaced video signal having a frame frequency of 24 Hz. This encoder has a field identification signal generating unit for externally receiving the interlaced video signal to thereby generate a field identification signal indicative of switching of the respective fields of the interlaced video signal; and an encoding unit for externally receiving a top field signal which becomes active with respect to a top field among the plural fields of the interlaced video signal corresponding to the respective frames of the non-interlaced video signal, and for encoding the interlaced video signal based on the top field signal and the field identification signal by skipping the portion of the overlapped fields. Also, a secondary top field signal may be generated by changing an even-numbered field in said top field signal into a non-active field based upon said field identification signal when said top field signal continuously becomes active over a plurality of fields corresponding to the respective frames of said non-interlaced video signal.

9 Claims, 6 Drawing Sheets

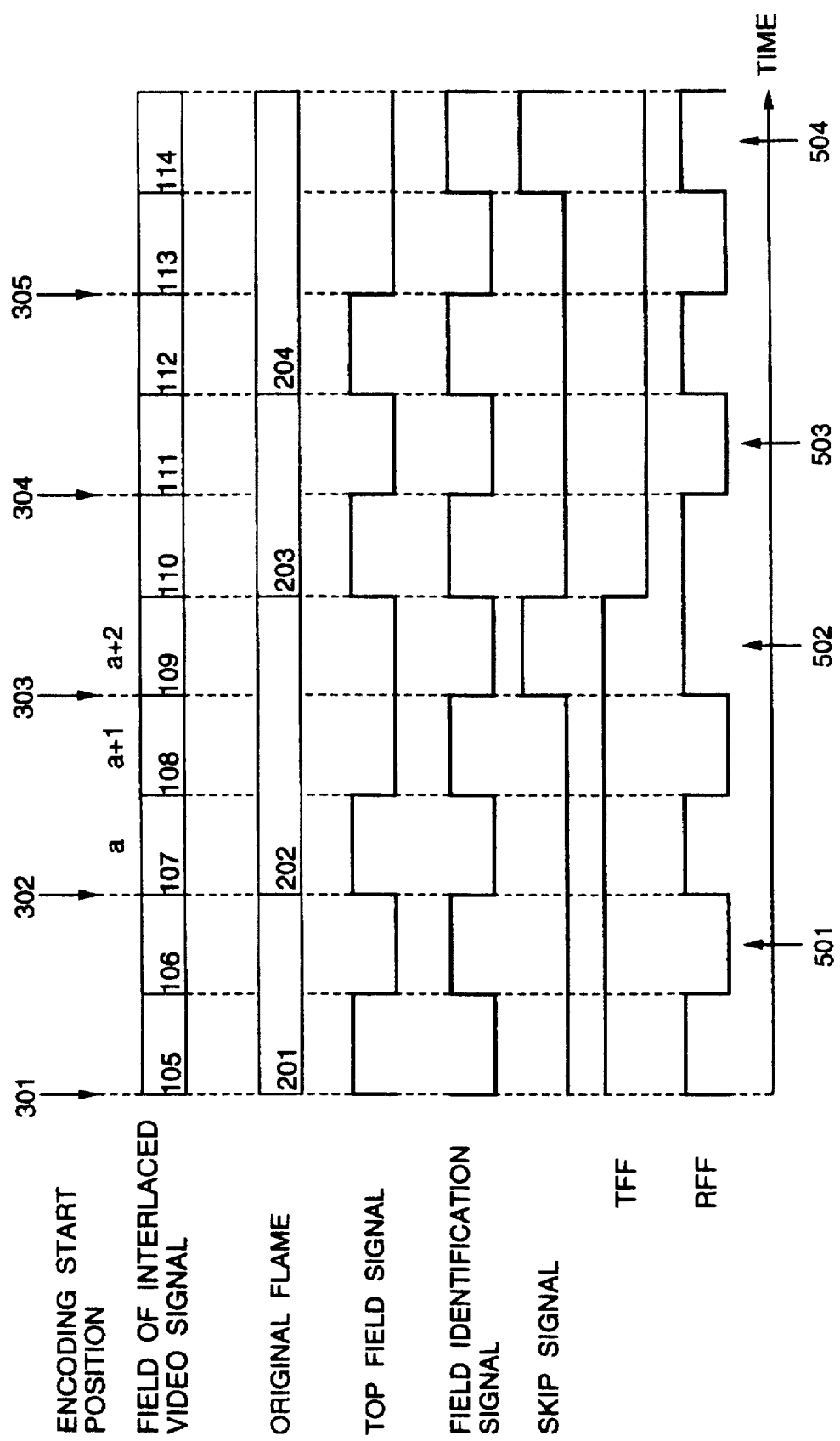

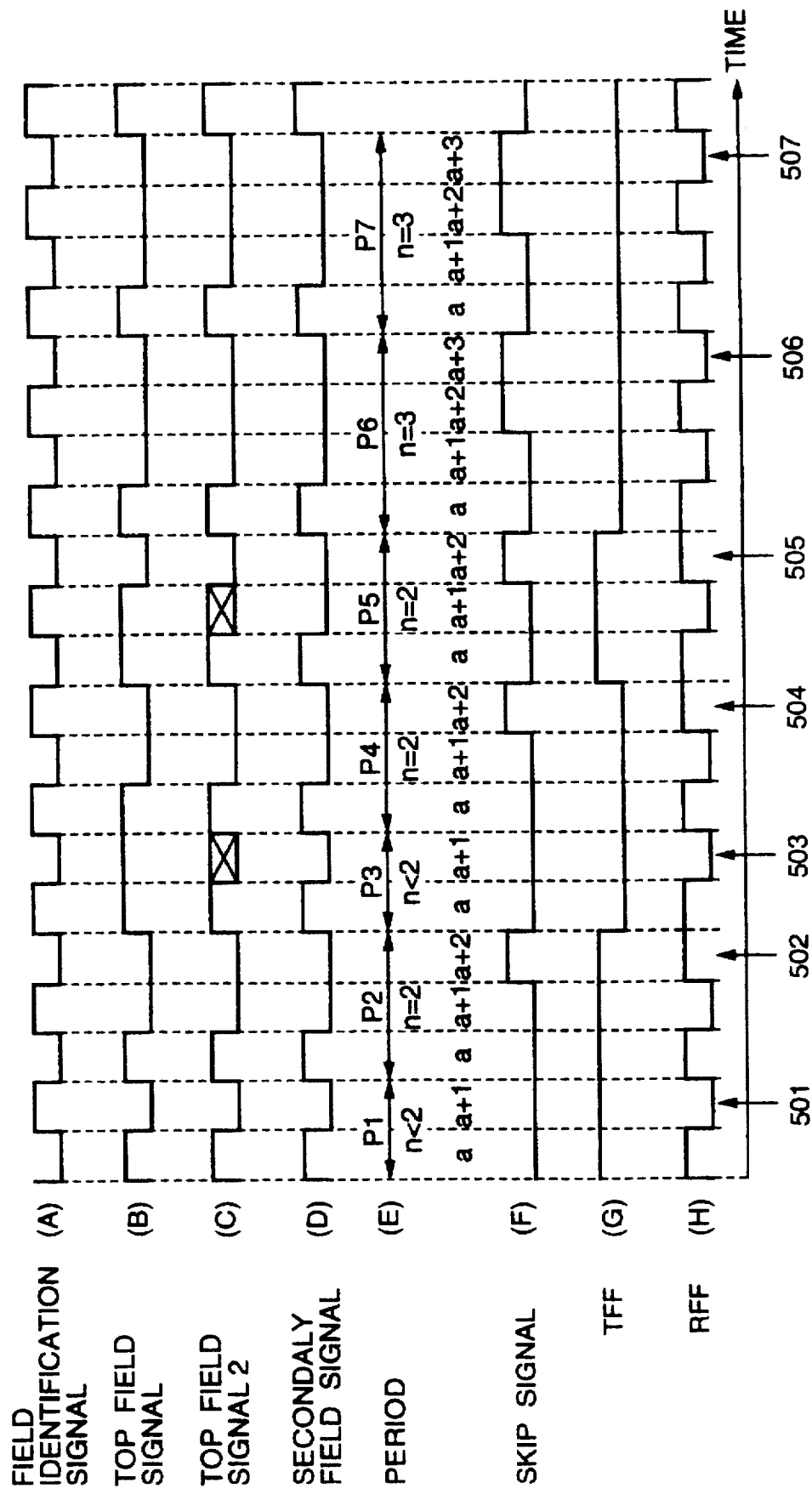

VIDEO SIGNAL ENCODER

BACKGROUND OF THE INVENTION

1. Field of the Invention

The present invention relates to a video signal encoder for encoding a moving image (picture) signal, and more specifically, to such an encoder suitably used to encode a video signal which is processed by way of a so-called "telecine conversion". In the telecine conversion, a content of a movie film is converted into a video signal corresponding thereto.

2. Description of the Related Art

Generally speaking, 24 frames of pictures per second are recorded on a film used in the movie. This corresponds to a non-interlaced video signal whose vertical sync frequency is 24 Hz. It should be noted that this signal will be referred to as a "film video signal" hereinafter. On the other hand, a video signal of the NTSC TV system corresponds to an interlaced video signal whose vertical sync frequency is 60 Hz. Therefore, in the telecine conversion for converting the above-described film video signal into the video signal of the NTSC TV system, the non-interlaced film video signal of 24 Hz is converted into the interlaced video signal of 60 Hz by overlapping a portion of fields.

There is possibility that the interlaced video signal of 60 Hz which has been telecine-converted in the above-described manner is compression-encoded (high-efficiency encoded in order to increase the transfer rate or the recording density. However, since the telecine-converted video signal contains the overlapped fields, if this video signal is directly compression-encoded, then waste information will appear, which may impede the high efficiency encoding operation.

Accordingly, the following conventional method has been employed. That is, in order that the above-explained overlapped fields produced by the telecine conversion are not encoded/recorded, the signal for designating the overlapped fields (will be referred to as a "skip signal" hereinafter) is produced during the telecine conversion, and then the video signal is encoded based upon this skip signal.

Referring now to FIG. 1, a concrete method for the telecine conversion will be described in detail.

FIG. 1 schematically illustrates a so-termed "3–2 pull down" processing manner utilized in the telecine conversion. Reference numerals 101 to 104 indicate picture frames of the non-interlaced film video signal of 24 Hz. To convert this non-interlaced film video signal into the inter-laced video signal, each picture frame is subdivided into a first field indicated by a solid line, and also a second field denoted by a dotted line.

However, if this frame subdivision is employed, then the non-interlaced film signal of 24 Hz would be simply converted into such an interlaced video signal having a twice frequency, namely 48 Hz. Therefore, the overlapped fields are inserted into the interlaced video signal of 48 Hz at a rate of 1 field per 4 fields, so that it is converted into such an interlaced video signal of 60 Hz equal to 5/4 times higher than 48 Hz, namely 5/4=(4+1)/4. Reference numerals 105 to 114 shown in FIG. 1 represent the respective fields of the interlaced video signal of 60 Hz which has been converted in accordance with the above-explained converting method. Among these fields 105 to 114, the field 109 and the field 114 correspond to the inserted fields, the field 109 is overlapped with the field 107 whereas the field 114 is overlapped with the field 112. The telecine conversion may be realized by periodically performing the above-described process operation with respect to the film video signal. As described above, since either 3 fields or 2 fields of the interlaced video signal having the frequency of 60 Hz are produced from one frame of the non-interlaced film video signal having the frequency of 24 Hz, this processing manner is called as the "3–2 pull down".

Subsequently, a description will now be made of a method for encoding such a telecine-converted video signal with reference to FIG. 2.

As described above, in order to achieve the high efficiency encoding operation, the fields except for the overlapped fields 109 and 114 are preferably encoded. To this end, in a video signal encoder, all of the fields of the 60 Hz-interlaced video signal are not encoded, but the fields except for the overlapped fields are encoded to thereby produce the video data. Thereafter, as will be explained later, both information called as a top field first flag TFF, and information called as a repeat first field flag RFF are added to the video data, and then all of the above-described information is recorded on an optical disk and the like, so that the 3–2 pull down operation is performed on the reproducing unit.

FIG. 2 schematically represents a relationship between the respective frames of the video signal and the above-described TFF and RFF. In this drawing, reference numerals 105 to 114 indicate fields processed by way of the 3–2 pull down method, which correspond to FIG. 1. However, the field 109 and the field 114 are not encoded. These fields have constituted the frame such as shown by the reference numerals 201 to 204 in the original film video signal. This "frame" will be referred to as an "original frame" in the following description.

It should be understood in the below-mentioned explanation that the above-described top field first flag TFF is such a signal for indicating that a top field in the original frames 201 to 204 corresponds to a first field indicated by a solid line in the original film video signal (FIG. 1), and is such a high active signal that a logic "1" is effective.

It should also be noted in the below-mentioned explanations that the above-described repeat first field flag RFF is such a signal for denoting that a top field in the original frames 201 to 204 should be repeatedly reproduced, and is such a high active signal that a logic "1" is effective.

In such a frame that the top field first flag TFF is non-active, the second field indicated by a dotted line in the original film video signal (FIG. 1) is firstly reproduced.

Also, in such a frame that the repeat first field flag RFF is active, after this frame has been reproduced, the top field within this frame is repeatedly reproduced, whereas in the repeat first field flag RFF is non-active, this frame is reproduced as it is.

As described above, the encoded video data is decoded in accordance with the top field first flag TFF and the repeat first field flag RFF in the reproducing unit, so that the interlaced video signal having the field frequency of 60 Hz can be reproduced.

Referring now to FIG. 3, the operations of the conventional video signal encoder will be described. In the conventional video signal encoder, when the video signal is encoded or recorded, the skip signal indicative of such a field which is not encoded is produced or inputted therein, and then this skip signal is used to control the signal processing operation.

FIG. 3 illustrates a relationship between the video signal and the skip signal. The fields 105 to 114 of the interlaced video signal correspond to the field shown in FIG. 1 and FIG. 2, and the frames 201 to 204 of the non-interlaced video signal correspond to the frames shown in FIG. 2.

In the video signal encoder, it is an important aspect to determine which field is firstly encoded when either the encoding operation or the recording operation of the entered video signal is commenced. In general, to designate the encoding start position or the recording start position of the inputted video signal, the time code and the like are employed to designate this starting position every frame of such an interlaced video signal having a frequency of 30 Hz. As a consequence, the designatable starting position is indicated as arrows 301 to 305 of FIG. 3.

In such a case that the starting position denoted by the arrow 301 is designated, since the field 105 corresponds to the top field within the original frame 201, the fields from this field 105 may be commenced to be encoded. Similarly, when the starting position denoted by the arrow 302 is designated, the fields from the field 107 may be commenced to be encoded. It should be noted that such a judgment that these data are effective can be established only by confirming that the skip signal corresponding to the field 106 or the field 108 is not present. To this end, it is required to employ either a buffer or a memory capable of storing at least two fields of the picture.

On the other hand, when the starting position indicated by the arrow 303 is designated, since the field 109 is indicated by the skip signal in such a manner that this field 109 is not encoded, the encoding operation may be started from the next field 110 corresponding to the top field of the original frame 203.

However, when a designation is made of the starting position indicated by either the arrow 304 or the arrow 305, a problem will be produced. This is because either the field 111 or the field 113 corresponding to the starting position indicated by either the arrow 304 or the arrow 305 is not equal to the top field in the original frame.

As a result, when the starting position indicated by the arrow 304 is designated, the encoding operation should be started from the field 110 positioned prior to the field 111 by one field, or the encoding operation should be commenced from the field 112 positioned subsequent to this field 111. Similarly, when the starting position indicated by the arrow 305 is designated, the encoding operation should be started from the field 112 positioned prior to the field 113 by one field, or the encoding operation should be commenced from the field 114 positioned subsequent to this field 113.

However, since the field 114 is indicated by the skip signal so as not to be encoded, the encoding operation should be started from a further subsequent field. In this prior art, when the starting designation of the encoding operation is made, no judgment can be made that either the field 111 or the field 113 does not correspond to the top field in the frame. Instead, this judgment could be made after the skip signal for the field 114 could be finally obtained. As a consequence, there is another problem that such a buffer or memory must be employed which may store at least the video data about the fields 111 to 114 while the above-described judgment could be made.

Moreover, there are complex problems in such a case that the film video signals are edited and thus the field arrangement is irregularly established.

SUMMARY OF THE INVENTION

The present invention has been made to solve the above-described problems, and therefore, has an object to provide a video signal encoder capable of immediately discriminating such a field to be encoded from another field to be discarded when a telecine-converted interlaced video signal is encoded in a high efficiency, while reducing an extra buffer or memory.

To achieve the above-explained object, a moving picture (image) signal encoding apparatus, according to a first aspect of the present invention, comprises: video signal converting means for receiving a non-interlaced video signal having a frame frequency of 24 Hz, and for converting said non-interlaced video signal into an interlaced video signal having a field frequency of 60 Hz by overlapping a portion of a plurality sets of first and second fields, in which each set is produced from one frame of said non-interlaced video signal; top field signal generating means for generating such a top field signal which becomes active with respect to a top field among a plurality of fields of said interlaced video signal corresponding to the respective frame of said non-interlaced video signal; field identification signal generating means for generating a field identification signal indicative of switching of the respective fields of said interlaced video signal; and encoding means for encoding said interlaced video signal by skipping said portion of overlapped fields based upon both said top field signal and said field identification signal.

The above-described video signal encoder may further comprise skip signal generating means for generating a skip signal which becomes active with respect to the remaining fields except for first two fields among the fields of said interlaced video signals corresponding to the respective frame of said non-interlaced video signal when the number of said fields of the interlaced video signal is not less than 3, and the above-explained encoding means may encode said interlaced video signal by skipping a field while said skip signal becomes active.

With the above-described arrangement, for instance, when the field identification signal indicates that the first field is to be encoded, and also the top field signal represents that the inputted video signal is not the top fields, it is possible to immediately judge that this field should not be encoded. As a consequence, such a buffer or a memory is no longer required which stores the data of this field until the judgment is made as to whether or not this field should be outputted.

Also, a moving picture signal encoding apparatus, according to a second aspect of the present invention, is a video signal encoder for encoding an interlaced video signal having a field frequency of 60 Hz obtained by overlapping a portion of a plurality sets of first and second fields, in which each set is produced from one frame of a non-interlaced video signal having a frame frequency of 24 Hz, which apparatus comprises: field identification signal generating means for externally receiving said interlaced video signal to thereby generate a field identification signal indicative of switching of the respective fields of said interlaced video signal; secondary top field signal generating means for externally receiving a top field signal which becomes active with respect to a top field among a plurality of fields of said interlaced video signal corresponding to the respective frame of said non-interlaced video signal, and for generating a secondary field signal produced by changing said top field signal in an even-numbered field into a non-active state based upon said field identification signal when said top field signal continuously becomes active over a plurality of fields corresponding to the respective frame of said non-interlaced video signal; and encoding means for encoding said interlaced video signal based on said secondary top field signal and said field identification signal by skipping said portion of the overlapped fields.

With employment of the above-explained arrangement, when the top field signals which originally do not become active in the continuous fields may continuously become active over a plurality of fields within the same frame, for instance, at an editing boundary of a film video signal, such a secondary first field signal that the even-numbered field is changed into a nonactive field is produced. Thus, the video signal is encoded by skipping the overlapped fields based upon this secondary first field signal. As a result, even when the fields are not regularly arranged due to the editing operation, since it is possible to immediately judge the field which should be encoded, the extra buffer or memory is no longer required.

BRIEF DESCRIPTION OF THE DRAWINGS

FIG. 5 is a timing chart for showing state transitions of a top field signal, a field identification signal, a skip signal, flags TFF and RFF used in the video signal encoder according to the first embodiment of the present invention; and FIG. 6 is a timing chart for representing a second top field signal and the like employed in a video signal encoder according to a second embodiment of the present invention in a case that a film video signal is edited.

DESCRIPTION OF THE PREFERRED EMBODIMENTS

Referring now to drawings, video signal encoders according to the present invention will be described in detail.

Figure 1:
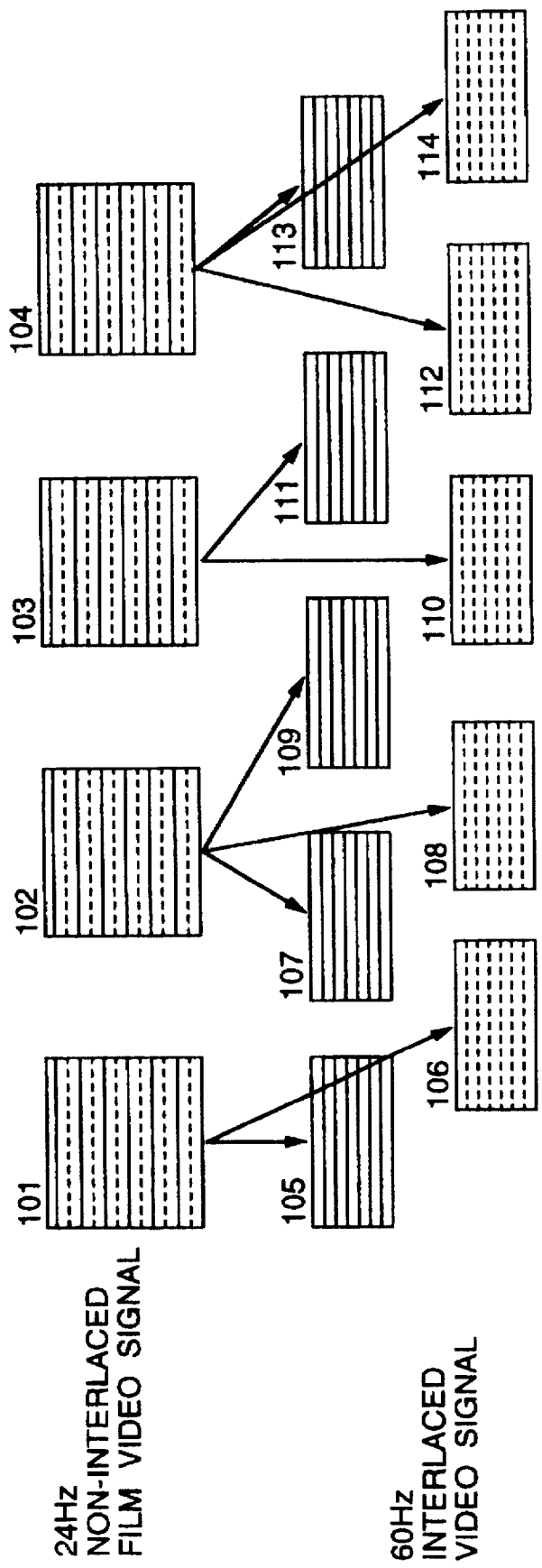
FIG. 1 schematically indicates the basic idea of the "3-2 pull down" method.
Figure 2:
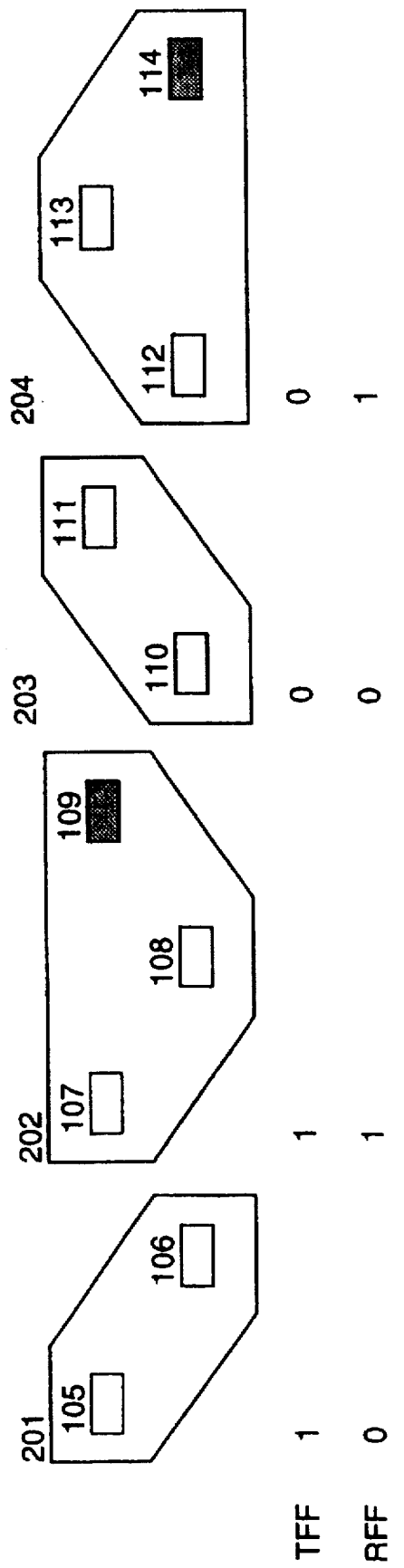
FIG. 2 schematically shows a relationship between the field of the telecine-converted video signal and the frame of the original film video signal, and another relationship between the flags TFF and RFF corresponding thereto.
Figure 3:
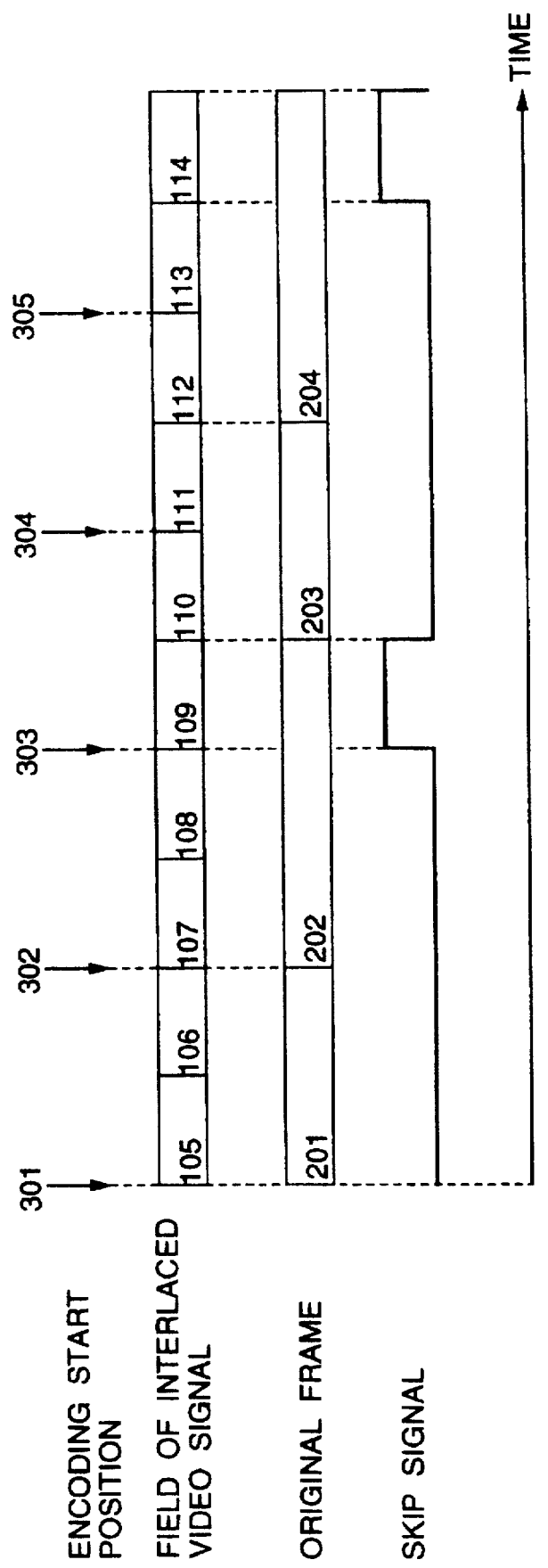
FIG. 3 is a timing chart for representing the state transitions of the skip signal with reference to the relationship between the field of the telecine-converted video signal and the frame of the original film video signal.
Figure 4:
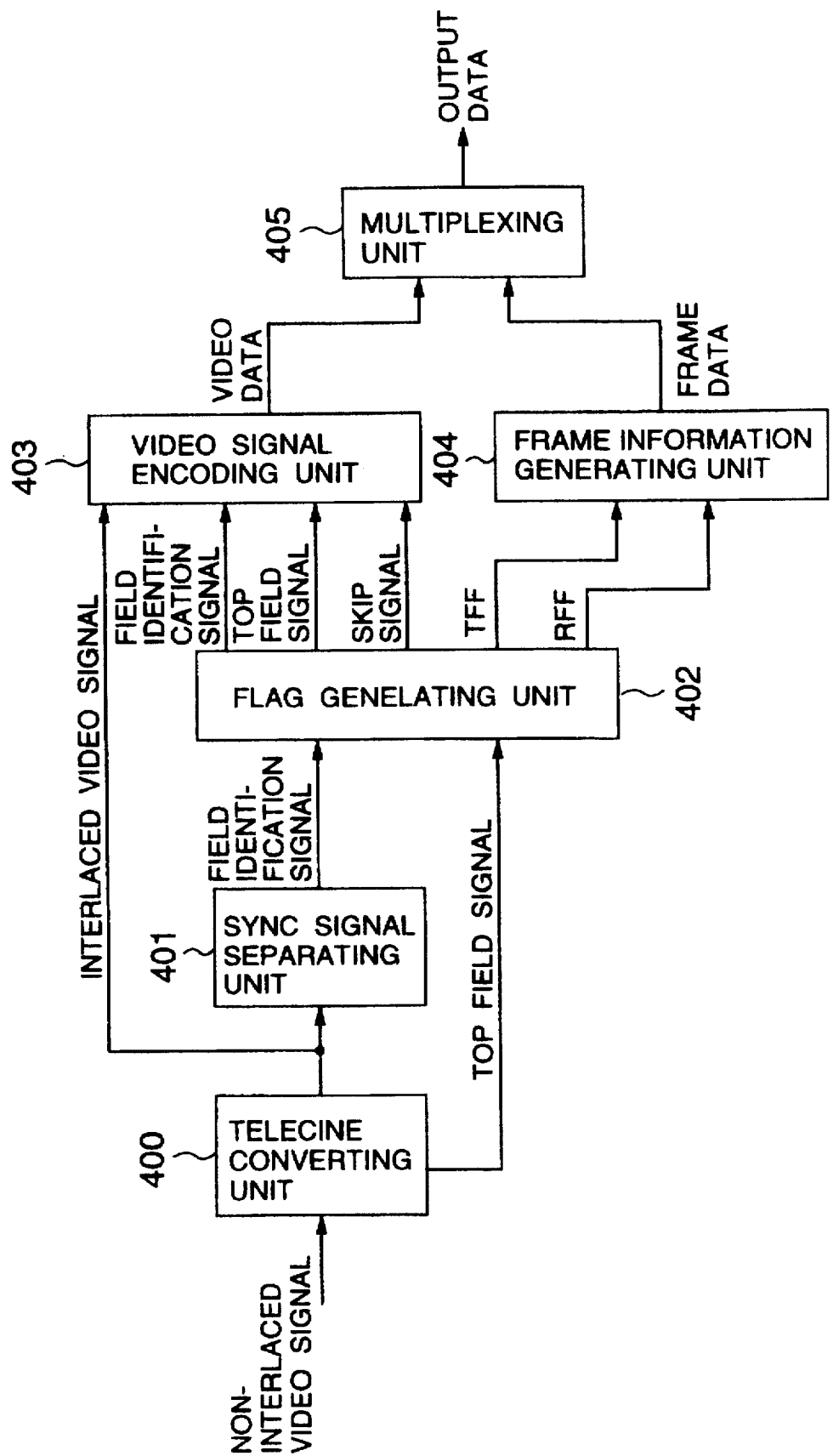
FIG. 4 is a schematic block diagram for indicating an overall arrangement of a video signal encoder according to a first embodiment of the present invention.

FIG. 4 schematically indicates a video signal encoder according to a first embodiment of the present invention. The video signal encoder according to this first embodiment is arranged by a telecine converting unit 400, a sync signal separating unit 401, a flag generating unit 402, a video signal encoding unit 403, a frame information producing unit 404, and a multiplexing unit 405.

The telecine converting unit 400 converts a non-interlaced film video signal having a frame frequency of 24 Hz into an interlaced video signal having a field frequency of 60 Hz in such a manner that each of frames of this non-interlaced film video signal inputted therein is separated into a first field and a second field, and then the 3-2 pull down operation is carried out for these fields. At this time, such a top field signal is produced which becomes active with respect to top fields within a plurality of fields of the interlaced video signal corresponding to the respective frames of the film video signal.

The sync signal separating unit 401 generates a field identification signal on the basis of the interlaced video signal. The field identification signal is a signal for identifying a first field and a second field in a 30 Hz-frame constructed of successive two 60 Hz-fields, wherein the first field is represented by "0" and the second field is represented by "1".

The flag generating unit 402 generates a skip signal, a top field first flag TFF, and a repeat first field flag RFF on the basis of a top field signal and a field identification signal in accordance with the following rule.

As represented in FIG. 5, the skip signals become active in a plurality of fields except for the firstly located two fields of the interlaced video signal within the original frame. That is, the skip signals become active in the fields except for the earliest two fields (namely, a-th field and (a+1)th field) within n fields defined from a certain effective top field (namely, a-th field) to another field located immediately before the next effective top field (namely, (a+n)th field, $n \geq 2$).

The top field first flag TFF becomes active with respect to such a frame that a top field within one frame of the film video signal indicated by the top field signal is made coincident with a first field of the interlaced video signal indicated by the field identification signal.

The repeat first field flag RFF becomes active at a preselected identification point (reference numerals 501 to 504 of FIG. 5) when the number of fields of the interlaced video signal corresponding to the respective frame of the film video signal is odd number.

Upon receipt of the interlaced video signal outputted from the telecine converting unit 400, the video signal encoding unit 403 encodes this interlaced video signal to thereby produce video data only in such fields that the skip signal generated by the flag generating unit 402 becomes nonactive.

Also, when the encoding operation or the recording operation of the video signal is commenced, the video signal encoding unit 403 judges as to whether or not a sort of field indicated by the top field signal generated by the telecine converting unit 400 is coincident with a sort of the field indicated by the field identification signal produced by the sync signal separating unit 401. For instance, in the case that a position indicated by an arrow 305 is designated so as to start the encoding operation, the field identification signal represents that the first field of the interlaced video signal should be encoded in the field 113, whereas since the top field signal denotes that the field 113 does not correspond to the top field of the original frame, it is possible to immediately judge that the field 113 is not to be encoded. In the next field 114, since the skip signal becomes active, it is also possible to immediately judge that this field 114 is not to be encoded. As a result, either a buffer or a memory for storing therein the data of the field 113 or 114 is no longer required.

It should be noted that although the video signal encoder according to the first embodiment includes the telecine converting unit 400, the video signal encoder may be alternatively arranged by not employing this telecine converting unit 400, but by externally entering therein the interlaced video signal and the top field signal.

Next, a video encoder according to a second embodiment of the present invention will now be explained with reference to FIG. 4 and FIG. 6.

The video signal encoder according to the second embodiment will consider such a case that an input video signal is edited and thus fields thereof are not periodically arranged. In other words, there are some cases that a film video signal is edited, or such an edited video signal in which several video signals are chained to each other after telecine conversion is directly entered from an external source. In this case, more than two top fields will be continued in the interlaced video signal.

Accordingly, in this second embodiment, the flag generating unit 402 shown in FIG. 4 generates a secondary top field signal based upon the top field signal and the field identification signal in accordance with the below-mentioned rule. Other aspects of the video signal encoder according to the second embodiment are similar to those in the first embodiment.

When the top field signal becomes active with respect to more than two continuous fields, the secondary top field signal becomes inactive with respect to the even-numbered field of the more than two continuous fields. FIG. 6 represents a relationship between the top field signal (B) and the secondary field signal (D).

As indicated in FIG. 6, the top field signal (B) indicates that the two top fields are continuously produced at a period P5. This may be caused by such a case that the top fields are continuously produced at a boundary of the editing process. Also, when a film signal produced by telecine-converting a movie signal is chained to the normal NTSC video signal such as a commercial program during the editing process, the top fields may be continuously produced. A similar case may occur when a top field which should be originally cut out during the editing process is left and the subsequent frames are chained to each other under top field remaining condition.

Accordingly, infinite patterns may be conceived as the top field signal. However, for the sake of simple explanation, in FIG. 6, a description will now be made of such a pattern that the top field signal (B) has been inputted. This top field signal is different from the regularly arranged top field signal as indicated in FIG. 5.

FIG. 6 illustrates such a stage that the secondary top field signal (D) is produced from the top field signal (B). In this drawing, when the top field signal becomes active with respect to the continued fields, a signal (C) becomes inactive (nonactive) with respect to the even-numbered field indicated by a mark "X" within this continuous field.

Next, in order to explain the formation of the skip signal (F), periods defined from the respective effective top field to the field located immediately before the next effective top field are indicated as periods P1 to P7 as shown in this drawing.

In such a period where the number of fields (clock periods) "n" is not less than 2, within two clock periods defined from a start clock period in this period to the succeeding clock period (the a-th clock period and the (a+1)th clock period), the skip signal (F) becomes nonactive, as illustrated in FIG. 6.

Also, in such a period where the number "n" is less than 2, the skip signal (F) becomes nonactive. As a consequence, as the clock period during which the skip signal (F) becomes active, there are the (a+2)th clock period in a period P2, the (a+2)th clock period in a period P4, the (a+2)th clock period in a period P5, the (a+2)th and (a+3)th clock periods in a period P6, and also the (a+2)th and (a+3)th clock periods in a period P7.

It should be understood that the "clock period" in this embodiment does not imply the operation clock itself of the apparatus, but is defined as follows. That is, for the sake of convenience, a period at timing when the field identification signal (A) shown in FIG. 6 is switched is defined as one "clock period".

The interlaced video signal is also inputted to the video signal encoding unit 403 indicated in FIG. 4, so that only the video signal of such a field where the skip signal generated from the flag generating unit 402 becomes nonactive is encoded.

Similar to the first embodiment, when the encoding operation or recording operation of the video signal is commenced, a judgment is made as to whether or not the video signal is encoded based upon the top field signal and the field identification signal.

It should be noted that as this video signal encoding unit 403, a video signal encoder such as a video signal encoder adapted to the MPEG2 standard (ISO/IEC13818-2) may be utilized in which at least two sorts of field compressions for an interlaced video signal are carried out. Alternatively, it is possible to employ such a video signal encoder operable in accordance with other technical standard.

The top field first flag TFF (see FIG. 6(G)), and the repeat first field flag RFF (see FIG. 6(H)), which are produced from the flag generating unit 402, are entered into the frame information generating unit 404, and are assembled into a portion of the frame information data (header portion). It should be noted that the repeat first field flag RFF is identified at identification points 501 to 507.

Finally, both the video data produced from the video signal encoding unit 403 and the frame information data produced from the frame information generating unit 404 are entered into the multiplexing unit 405 so as to be multiplexed, so that the output data is produced therein.

Next, a description will now be made of a sequential operation to decode the video signal which has been encoded by the above-described video signal encoder according to the first embodiment. In a decoder, the control information (header portion) such as the top field first flag TFF and the repeat first field flag RFF, and also the video data are separated from the input data.

Then, in such a frame that the top field first flag TFF becomes active, a first field referred to the 24 Hz non-interlaced signal is firstly indicated. In another frame that the top field first flag TFF becomes nonactive (inactive), a second field referred to as the 24 Hz non-interlaced signal is firstly indicated.

Also, in such a frame that the repeat first field flag RFF becomes active, after the frame is displayed, the field firstly indicated in the frame is repeatedly represented. In another frame that the repeat first field flag RFF becomes nonactive, the frame is displayed as it is.

As a consequence, it is possible to achieve the telecine conversion in the decoder. When a video signal is encoded according to the MPEG standard, the MPEG decoder may be employed, namely such an decoding circuit adapted to the encoding theory may be utilized.

It should be understood that although no description is made of the circuit arrangement subsequent to the multiplexing circuit in this embodiment, a recording apparatus such as a CD-ROM writer is connected when the entire system is realized as a CD-ROM.

Also, as apparent from the foregoing descriptions, when the video data is recorded on any recording media other than the above-described recording medium, the proper writing apparatuses may be employed. When the communication control apparatus is connected to this multiplexing unit, this system may be utilized in the broadcasting/data communications such as video-on-demand communications.

According to the video signal encoder of the present invention, the field to be skipped can be correctly judged based upon only the top field signal and the field identification signal to thereby constitute the frame. As a result, such a buffer or a memory is no longer required which stores therein the input video signals to be discarded while the frame structure is judged. Therefore, the video signal encoder can be constructed with employment of the low capacity memory. Also, the video signal recording apparatus with employment of the small capacity memory can be realized.

I claim:

1. A video signal encoder comprising:

video signal converting means for receiving a non-interlaced video signal having a frame frequency of 24 Hz, and for converting said non-interlaced video signal into an interlaced video signal having a field frequency of 60 Hz by overlapping a portion of a plurality sets of first and second fields, each of said plurality sets being produced from one frame of said non-interlaced video signal;

top field signal generating means for generating such a top field signal which becomes active with respect to a top field among a plurality of fields of said interlaced video signal corresponding to a respective frame of said non-interlaced video signal;

field identification signal generating means for generating a field identification signal indicative of switching of the respective fields of said interlaced video signal; and encoding means for encoding said interlaced video signal by skipping said portion of overlapped fields based upon both said top field signal and said field identification signal.

2. A video signal encoder according to claim 1 wherein:

said video signal encoder further comprises skip signal generating means for generating a skip signal which becomes active with respect to the remaining fields except for first two fields among the fields of said interlaced video signals corresponding to a respective frame of said non-interlaced video signal when a number of said fields of the interlaced video signal is not less than 3; and said encoding means encodes said interlaced video signal by skipping a field while said skip signal becomes active.

3. A video signal encoder according to claim 1, further comprising:

reproduction control signal generating means for generating a first reproduction control signal which becomes active during a preselected period when a top field indicated by said top field is coincident with a first field indicated by said field identification signal, and also for generating a second reproduction control signal which becomes active during a predetermined period when a number of fields of said interlaced video signal corresponding to the respective frame of said non-interlaced video signal is odd; and multiplexed output means for multiplexing said first and second reproduction control signals with an output of said encoding means to thereby output a multiplexed signal.

4. A video signal encoder for encoding an interlaced video signal having a field frequency of 60 Hz obtained by overlapping a portion of a plurality sets of first and second fields, each of said plurality sets being produced from one frame of a non-interlaced video signal having a frame frequency of 24 Hz, said video signal encoder comprising:

field identification signal generating means for externally receiving said interlaced video signal to thereby generate a field identification signal indicative of switching of the respective fields of said interlaced video signal; and encoding means for externally receiving a top field signal which becomes active with respect to a top field among a plurality of fields of said interlaced video signal corresponding to a respective frame of said non-interlaced video signal, and for encoding said interlaced video signal based on said top field signal and said field identification signal by skipping said portion of the overlapped fields.

5. A video signal encoder according to claim 4 wherein:

said video signal encoder further comprises skip signal generating means for generating a skip signal which becomes active with respect to the remaining fields except for first two fields among the fields of said interlaced video signals corresponding to a respective frame of said non-interlaced video signal when a number of said fields of the interlaced video signal is not less than 3; and said encoding means encodes said interlaced video signal by skipping a field while said skip signal becomes active.

6. A video signal encoder according to claim 4 wherein:

reproduction control signal generating means for generating a first reproduction control signal which becomes active during a preselected period when a top field indicated by said top field is coincident with a first field indicated by said field identification signal, and also for generating a second reproduction control signal which becomes active during a predetermined period when a number of fields of said interlaced video signal corresponding to the respective frame of said non-interlaced video signal is odd; and multiplexed output means for multiplexing said first and second reproduction control signals with an output of said encoding means to thereby output a multiplexed signal.

7. A video signal encoder for encoding an interlaced video signal having a field frequency of 60 Hz obtained by overlapping a portion of a plurality sets of first and second fields, each of said plurality sets being produced from one frame of a non-interlaced video signal having a frame frequency of 24 Hz, said video signal encoder comprising:

field identification signal generating means for externally receiving said interlaced video signal to thereby generate a field identification signal indicative of switching of the respective fields of said interlaced video signal;

secondary top field signal generating means for externally receiving a top field signal which becomes active with respect to a top field among a plurality of fields of said interlaced video signal corresponding to a respective frame of said non-interlaced video signal, and for generating a secondary field signal produced by changing said top field signal in an even-numbered field into a non-active state based upon said field identification signal when said top field signal continuously becomes active over a plurality of fields corresponding to the respective frame of said non-interlaced video signal; and encoding means for encoding said interlaced video signal based on said secondary top field signal and said field identification signal by skipping said portion of the overlapped fields.

8. A video signal encoder according to claim 7 wherein:

said video signal encoder further comprises skip signal generating means for generating a skip signal which becomes active with respect to the remaining fields except for first two fields among the fields of said interlaced video signals corresponding to a respective frame of said non-interlaced video signal when a number of said fields of the interlaced video signal is not less than 3; and said encoding means encodes said interlaced video signal by skipping a field while said skip signal becomes active.

9. A video signal encoder according to claim 7, further comprising:

reproduction control signal generating means for generating a first reproduction control signal which becomes active during a preselected period when a top field indicated by said secondary top field is coincident with a first field indicated by said field identification signal, and also for generating a second reproduction control signal which becomes active during a predetermined period when a number of fields of said interlaced video signal corresponding to the respective frame of said non-interlaced video signal is odd; and multiplexed output means for multiplexing said first and second reproduction control signals with an output of said encoding means to thereby output a multiplexed signal.

* * * * *